T. D. EVANS.
RAIL JOINT.
APPLICATION FILED FEB. 14, 1912.
1,045,777.
Patented Nov. 26, 1912.
2 SHEETS—SHEET 1.
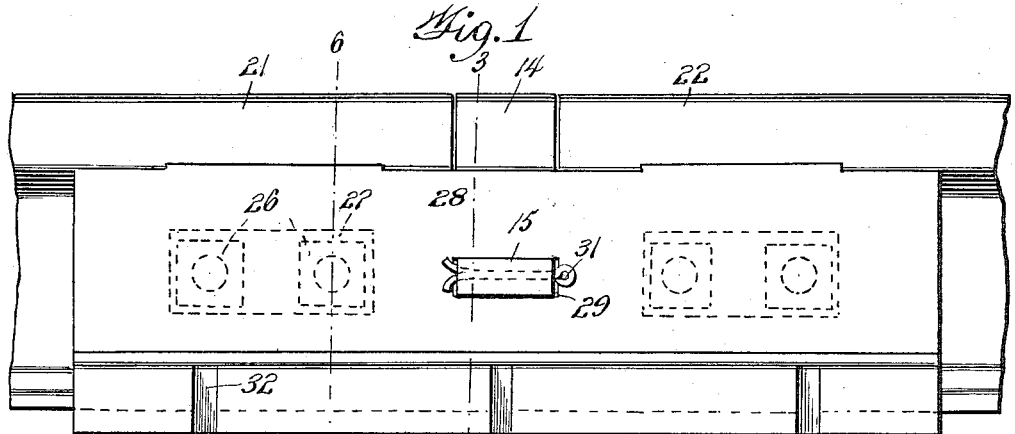
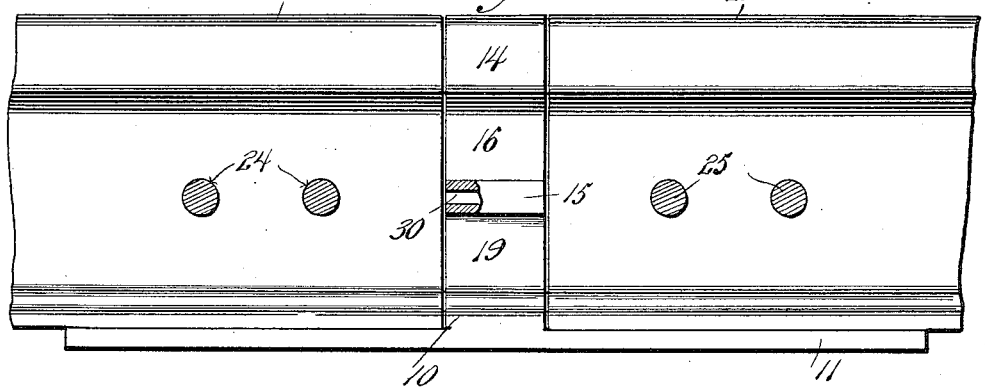
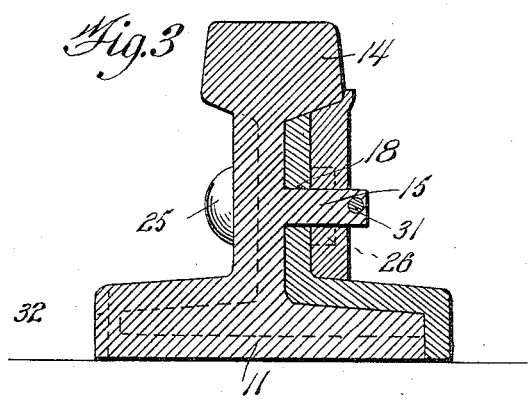
Witnesses
W. S. McDowell
P. H. Hoster
Inventor
Thomas D. Evans
By Victor J. Evans
Attorney

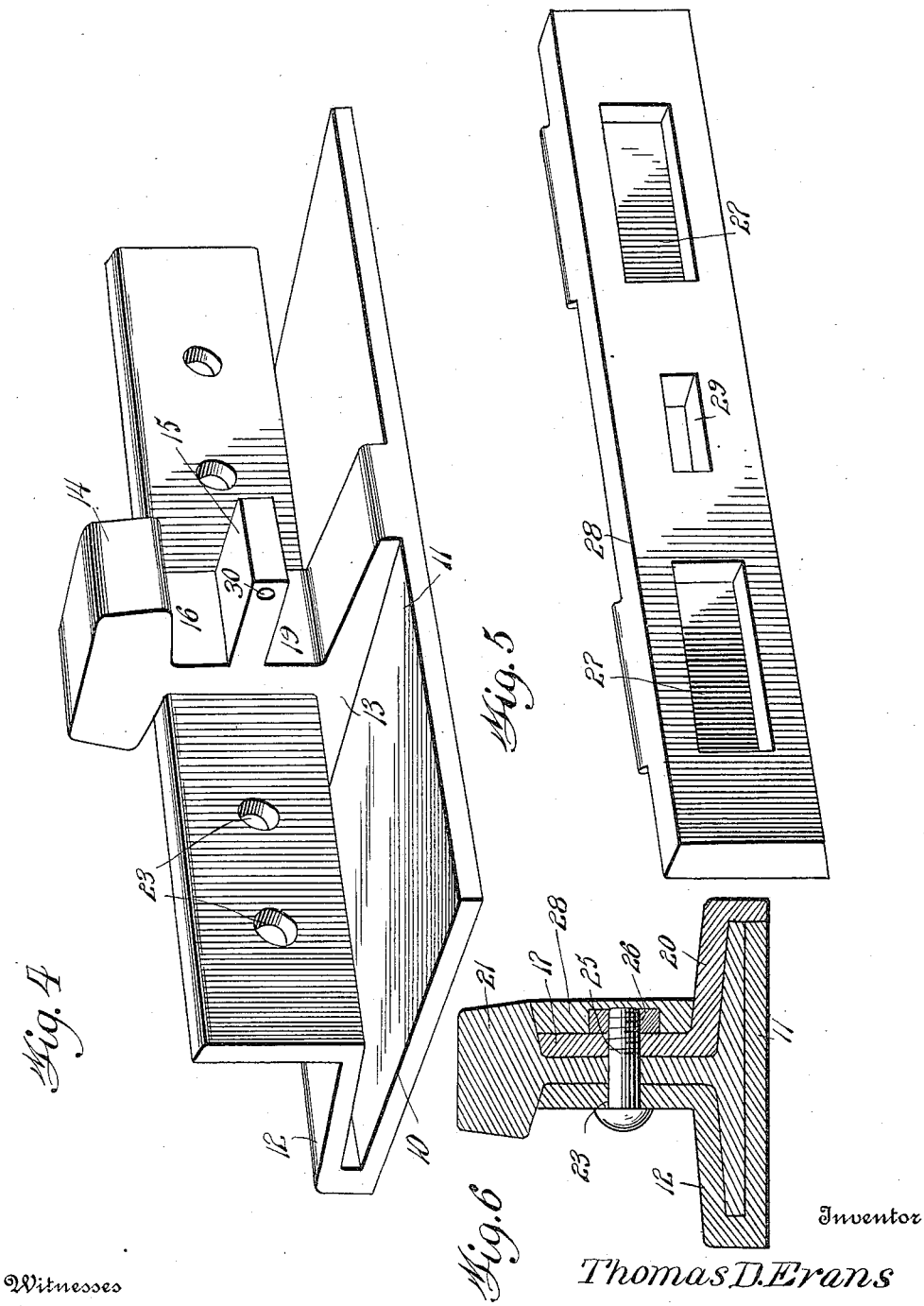

UNITED STATES PATENT OFFICE.

THOMAS D. EVANS, OF FOSTER, IOWA.

RAIL-JOINT.

1,045,777.  Specification of Letters Patent.  Patented Nov. 26, 1912.

Application filed February 14, 1912. Serial No. 677,413.

*To all whom it may concern:*

Be it known that I, THOMAS D. EVANS, a citizen of the United States, residing at Foster, in the county of Monroe and State of Iowa, have invented new and useful Improvements in Rail-Joints, of which the following is a specification.

An object of the invention is to provide a rail joint for connecting rail ends.

To accomplish the desired result use is made of a body provided with means for interposition between the rail ends to aline therewith, a fish plate for removable engagement with the rail ends and means for retaining the fish plate in engagement with the rail ends.

In the further disclosure of the invention, reference is to be had to the accompanying drawings constituting a part of this specification, in which similar characters of reference denote corresponding parts in all the views, and in which—

Figure 1 is a side elevation of my device. Fig. 2 is a similar side elevation, the locking plate and fish plate having been removed. Fig. 3 is a vertical transverse sectional view taken on the line 3—3 in Fig. 1. Fig. 4 is a perspective view of the rail chair. Fig. 5 is a perspective view looking at the inner side of the locking plate. Fig. 6 is a vertical transverse sectional view taken on the line 6—6 in Fig. 1.

Referring more particularly to the views, I provide a rail chair 10, consisting of a base 11 having formed on one side thereof and extending upwardly therefrom an integral fish plate 12. Formed integrally with the base 11 and the fish plate 12 and extending upwardly from a central portion of the base is a rail section 13, terminating at the upper end in a rail head 14 and having extended from one side thereof and formed integrally therewith a horizontal locking flange 15, a recess 16 being formed between the head 14 and the flange 15 to receive a fish plate 17, provided with an opening 18 through which the flange 15 is adapted to extend, a second recess 19 being formed between the lower portion of the rail section 13 and the flange 15 to accommodate the lower portion 20 of the fish plate 17.

In the use of my device, rail ends 21, 22 are mounted upon the base 11 on both sides of the rail section 13 and spaced a slight distance therefrom, the heads of the rail ends being adapted to lie in horizontal alinement with the head 14. The fish plate 12 is provided with openings 23 and the rail ends 21, 22 are provided with openings 24, the respective openings 23 and 24 being adapted to register to permit of passing bolts 25 therethrough, to secure the rail ends to the fish plate 12, suitable nuts 26 being threadedly mounted on the ends of the bolts 25, the said bolts having previously been passed through openings provided in the fish plate 17 and adapted to be received in recesses 27 formed on the inner side of the locking plate 28, provided with a central opening 29 through which is adapted to extend the locking flange 15, an opening 30 being provided in the outer extremity of the locking flange and adapted to receive a suitable cotter pin 31 therethrough, with the ends of the cotter pin engaging the locking plate 28, thus retaining the locking plate 28 and the fish plate 20 in locked and rigid relation relatively to the rail section 13 and the fish plate 12. The base 11 and the fish plate 20 are provided with recesses 32 adapted to receive therein suitable spikes or the like, secured to the tie or bed upon which my device is mounted, thus aiding in retaining the rail ends in proper relative relation and preventing a spreading of the rails at the point of connection of the rail ends with the rail joint. By providing the rail head 14, between the ends of the rail ends, a secure joint is provided and the rail ends are normally adapted to be spaced a slight distance from the rail section 13 to allow for any expansion or contraction of the rail ends and rail section.

I claim:—

1. In a rail joint the combination with a base, of a fish plate formed thereon, an upwardly extending rail section formed integrally with the said base and said fish plate, a laterally extending locking flange formed on the said rail section and spaced from the head thereof, a fish plate for removable engagement with the said locking flange and adapted to abut against rail ends mounted on the said base, the said locking flange being adapted to extend through an aperture in the second mentioned fish plate, and a locking plate for engagement with the second mentioned fish plate and said locking flange to retain the second mentioned fish plate in locked engagement with the said rail section.

2. In a rail joint the combination with a base, of a fish plate formed thereon, an upwardly extending rail section formed integrally with the said base and said fish plate, a laterally extending locking flange formed on the said rail section and spaced from the head thereof, a fish plate for removable engagement with the said locking flange and adapted to abut against rail ends mounted on the said base, the said locking flange being adapted to extend through an aperture in the second mentioned fish plate, a locking plate for engagement with the second mentioned fish plate and said locking flange to retain the second mentioned fish plate in locked engagement with the said rail section, and means for retaining the said locking plate in rigid engagement with the said second mentioned fish plate.

3. In a rail joint, a base adapted to receive rail ends, a fish plate extending upwardly from the said base, a rail section formed integral with the said base, adjacent the said fish plate, a locking flange extending from one side of the said rail section, a second fish plate adapted for engagement with the said rail section and provided with an opening through which the said locking flange is extended and a locking plate for engagement with the said locking flange to retain the said fish plate in rigid engagement with the said rail section.

In testimony whereof I affix my signature in presence of two witnesses.

THOMAS D. EVANS.

Witnesses:
LUCY MURRAY,
J. DORRING.

---

Copies of this patent may be obtained for five cents each, by addressing the "Commissioner of Patents, Washington, D. C."